US006683273B2

(12) United States Patent
Conway et al.

(10) Patent No.: US 6,683,273 B2
(45) Date of Patent: Jan. 27, 2004

(54) QUICK DISCONNECT HAVING A MAKE-BREAK TIMING SEQUENCE

(75) Inventors: Christopher J. Conway, Wilmot, NH (US); Fred Rogers, Enfield Center, NH (US)

(73) Assignee: Thermal Dynamics Corporation, West Lebanon, NH (US)

(*) Notice: Subject to any disclaimer, the term of this patent is extended or adjusted under 35 U.S.C. 154(b) by 268 days.

(21) Appl. No.: 10/053,032

(22) Filed: Nov. 9, 2001

(65) Prior Publication Data

US 2003/0089689 A1 May 15, 2003

(51) Int. Cl.[7] ................................................ B23K 10/00

(52) U.S. Cl. ............................ 219/121.51; 219/121.48; 219/121.54; 219/137.63; 219/137.9

(58) Field of Search .............................. 219/121.36, 74, 219/75, 121.48, 121.45, 121.46, 121.59, 121.39, 121.51, 121.52, 137.63, 137.9, 61, 121.54

(56) References Cited

U.S. PATENT DOCUMENTS 1,978,076 A 10/1934 Cassedy, Jr.
3,235,682 A 2/1966 Papworth
3,283,214 A 11/1966 Ortwig et al.
3,432,795 A 3/1969 Jayne
3,569,908 A 3/1971 Appleton
4,034,172 A 7/1977 Glover et al.
4,044,208 A 8/1977 McDonald et al.
4,140,358 A 2/1979 Marechal
4,166,664 A 9/1979 Herrmann, Jr.
4,529,861 A * 7/1985 Blanton ................. 219/137.63
4,628,392 A 12/1986 Didier
4,927,382 A 5/1990 Huber
4,939,339 A * 7/1990 Folkening et al. ..... 219/137.63
5,074,802 A 12/1991 Gratziani et al.
5,174,787 A 12/1992 Shirai et al.
5,346,406 A 9/1994 Hoffman et al.
5,655,916 A 8/1997 Hayashi
5,913,703 A 6/1999 Suzuki et al.
6,472,631 B1 * 10/2002 Eickhoff et al. ....... 219/121.39
6,475,215 B1 * 11/2002 Tanrisever ................... 606/45

* cited by examiner

*Primary Examiner*—Mark Paschall
(74) *Attorney, Agent, or Firm*—Harness, Dickey & Pierce, P.L.C.

(57) ABSTRACT

A quick disconnect for use in a plasma arc torch is provided wherein a plurality of connections disposed therein are configured such that the connections break in a specific order when the quick disconnect is disengaged. Preferably, the quick disconnect comprises a plurality of signal pin connections, a pilot return connection, a fluid connection, and a main power connection. Accordingly, the signal pin connections break before the pilot return connection, the fluid connection, and the main power connection. Further, the pilot return connection breaks before the fluid connection and the main power connection, and the fluid connection breaks before the main power connection as the quick disconnect is disengaged. As a result, a safer quick disconnect in which both gas and electric power are conducted is provided by the present invention.

37 Claims, 8 Drawing Sheets

QUICK DISCONNECT HAVING A MAKE-BREAK TIMING SEQUENCE

FIELD OF THE INVENTION

The present invention relates generally to fluid and electric connectors and more particularly to quick disconnects for use with a plasma arc apparatus in which both fluid and electric power are conducted through the quick disconnect.

BACKGROUND OF THE INVENTION

In manually operated plasma arc torches of the known art, a torch is commonly connected to a power supply through a torch lead, which is typically available in a variety of lengths according to requirements of a specific application. Additionally, the torch lead is often secured to the power supply using a quick disconnect such that the torch lead may be quickly and easily removed from the power supply in the event that the torch and/or torch lead is damaged or requires replacement. Further, the quick disconnect allows a torch and torch lead to be interchanged with a variety of power supplies if necessary.

Generally, the torch lead side of the quick disconnect comprises a housing, commonly in the form of a plug, with a variety of electrical and fluid, (e.g., gas, liquid), conductors disposed therein. Similarly, the power supply side of the quick disconnect also comprises a housing, commonly in the form of a socket adapted to receive the plug, with a mating set of electrical and fluid conductors disposed therein. Generally, one or more main power pins and mating sockets conduct both electricity and fluid for operation of the torch, through which high current, high voltage, and/or high frequency electrical power is provided to initiate and operate a plasma arc. Further, a plurality of signal pins and mating signal pin sockets conduct electrical signals for operation of the torch such as a trigger switch or electrical grounding, among others. Moreover, some or all of the conductors, including the main power pins and sockets, may be replaceable such that an inoperative or broken conductor may be replaced in the field as necessary.

Typically, the fluid and electrical conductors disposed within the plug and socket housings form connections when the quick disconnect is fully engaged. In some quick disconnects of the known art, all of the connections are simultaneously broken when the quick disconnect is disengaged. In other known art connectors, a fluid connection is broken first, followed by breaking the signal pin connections and then breaking the main power connection last. Unfortunately, the sequence of breaking connections in quick disconnects of the known art may cause inadvertent arcing if the quick disconnect was disengaged during operation of the torch. Further, gas may leak from the quick disconnect when the quick disconnect is not fully engaged. As a result, the plasma arc torch may become damaged and operate inefficiently when the quick disconnect is not fully engaged.

Accordingly, there remains a need in the art for a quick disconnect that reduces the risk of arcing and that prevents damage to the plasma arc apparatus when a quick disconnect is not fully engaged.

SUMMARY OF THE INVENTION

In one preferred form, the present invention provides a quick disconnect for use in a plasma arc apparatus comprising at least one signal connection, a pilot return connection, at least one fluid connection, and a main power connection. Accordingly, the connections are configured within the quick disconnect such that when the quick disconnect is disengaged, the signal connection breaks before the pilot return connection, the fluid connection, and the main power connection. Further, the pilot return connection breaks before the fluid connection and the main power connection, and the fluid connection breaks before the main power connection. Finally, the main power connection breaks after the signal connection, the pilot return connection, and the fluid connection. Generally, the signal connection is shorter that the pilot return connection, the fluid connection, and the main power connection. In addition, the pilot return connection is shorter than the fluid connection and the main power connection, and the fluid connection is shorter than the main power connection. As a result, the connections are broken in a specific order as the quick disconnect is disengaged.

In another preferred form, a quick disconnect for use in a plasma arc apparatus is provided that comprises at least one signal connection, at least one fluid connection, and a main power connection. Accordingly, the connections are configured such that when the quick disconnect is disengaged, the signal connection breaks before the fluid connection and the main power connection, the fluid connection breaks before the main power connection, and the main power connection breaks after the signal connection and the fluid connection. Similarly, the signal connection is shorter than the fluid connection and the main power connection, and the fluid connection is shorter than the main power connection.

In yet another form of the present invention, a method of disengaging a quick disconnect in a plasma arc apparatus is provided that comprises the steps of disengaging the quick disconnect such that at least one signal connection breaks before a pilot return connection, a fluid connection, and a main power connection. The quick disconnect is further disengaged such that the pilot return connection breaks before the fluid connection and the main power connection. Then, the quick disconnect is further disengaged such that the fluid connection breaks before the main power connection, and accordingly, the main power connection breaks after the signal connection, the pilot return connection, and the fluid connection.

As used herein, a plasma arc apparatus shall be construed by those skilled in the art to be an apparatus, whether manual or automated, that generates or uses plasma for cutting, welding, spraying, or marking operations, among others. Accordingly, the specific reference to plasma arc cutting torches or plasma arc torches herein shall not be construed as limiting the scope of the present invention.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
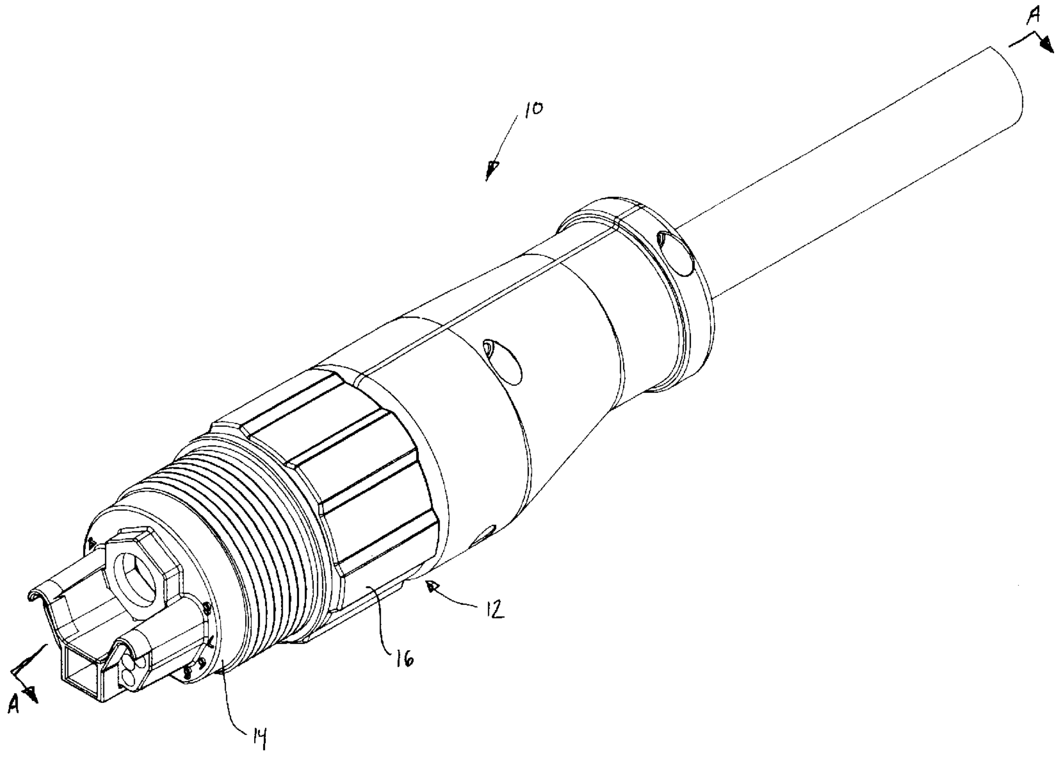
FIG. 1 is a perspective view of a quick disconnect constructed in accordance with the principles of the present invention.

Referring to the drawings, a quick disconnect according to the present invention is illustrated and generally indicated by reference numeral 10 in FIG. 1. As shown, the quick disconnect 10 comprises a plug housing 12 (hidden from view in FIG. 1, see FIGS. 2 through 7) engaged within a socket housing 14, wherein a locking ring 16 disposed around the plug housing 12 secures the plug housing 12 to the socket housing 14. Generally, the quick disconnect 10 provides a connection between a power supply (not shown) and a torch lead (not shown) in a manually operated plasma arc torch.

Figure 2A:
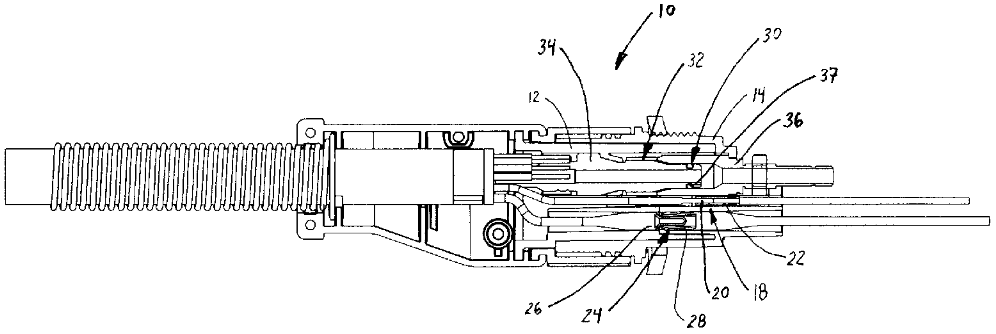
FIG. 2*a* is a cross-sectional view, taken along plane A—A of FIG. 1, of an embodiment of a quick disconnect fully mated and constructed in accordance with the principles of the present invention.

Referring now to FIG. 2*a*, a fully engaged quick disconnect 10 is illustrated, wherein a plurality of fluid and electrical connections are disposed within the quick disconnect 10. More specifically, at least one signal connection 18 is disposed within the quick disconnect 10, which generally comprises a signal pin 20 secured within the plug housing 12 and engaged within a signal pin socket 22 that is secured within the socket housing 14. Further, a pilot return connection 24 is disposed within the quick disconnect 10, wherein a pilot return pin 26 secured within the plug housing 12 is engaged within a pilot return socket 28 secured within the socket housing 14. Additionally, a fluid connection 30 and a main power connection 32 are disposed within the quick disconnect 10, in which a negative lead gas carrying pin 34 secured within the plug housing 12 is engaged within a main power socket 36 secured within the socket housing 14. As shown, the main power connection 32 is accomplished through direct contact between the negative lead gas carrying pin 34 and the main power socket 36, while the fluid connection 30 is accomplished using an o-ring 37 disposed around the negative lead gas carrying pin 34 and in contact with the main power socket 36.

Generally, the negative lead gas carrying pin 34 and the main power socket 36 conduct both gas and high current from the power supply, through the torch lead, and to the torch. As shown, the negative lead gas carrying pin 34 and main power socket 36 are positioned off-center to provide additional volume for the signal pins 20 and the signal pin sockets 22, along with the pilot return pin 26 and the pilot return socket 28, thereby resulting in a relatively compact quick disconnect 10 compared with conventional arrangements in which the pin and socket are centrally located. Further, the signal pins 20 and the signal pin sockets 22 conduct electricity for certain operations of the torch such as a trigger switch, electrical grounding, and/or a parts-in-place switch, among others. Additionally, the pilot return pin 26 and the pilot return socket 28 conduct electrical power that initiates a pilot arc for initiation of a plasma stream at the torch, which is generated as the gas is ionized by a high current conducted through the negative lead gas carrying pin 34 and the main power socket 36.

Figure 2B:
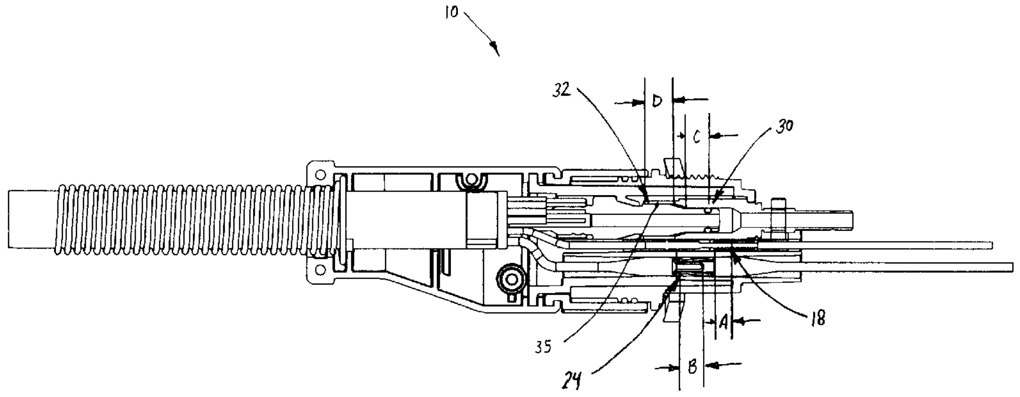
FIG. 2*b* is a cross-sectional view, taken along plane A—A of FIG. 1, of an embodiment of a quick disconnect fully mated, illustrating signal connection lengths and constructed in accordance with the principles of the present invention.

As shown in FIG. 2*b*, the signal connection 18 defines a length A, the pilot return connection 24 defines a length B, the fluid connection 30 defines a length C, and the main power connection 32 defines a length D. Generally, the lengths are defined as the overall length of the connection when the quick disconnect is in a fully engaged position as shown in FIG. 2 to when the respective connection is broken. Accordingly, the length A of signal connection 18 is defined by the extension of the signal pin 20 into the signal pin socket 22. Further, length A is shorter than the length B of the pilot return connection 24, the length C of the fluid connection 30, and the length D of the main power connection 32. Referring now to the pilot return connection 24, length B is defined by the extension of the pilot return pin 26 into the pilot return socket 28. Accordingly, the pilot return connection 24 is shorter than the length C of the fluid connection 30 and the length D of the main power connection 32. At the fluid connection 40, the length C is defined by the extension of the o-ring 37 within the main power socket 36, and as shown, the length C is shorter than length D of the main power connection 32. Finally, at the main power connection 32, the length D is defined by the extension of the negative lead gas carrying pin 34 within the main power socket 36, and more specifically the extension of a collar 35 within the main power socket 36, such that the length D of the main power connection 32 is longer than the other connections within the quick disconnect 10.

In one preferred form, length A of the signal connection 18 is approximately 0.21 in. (0.53 mm), the length B of the pilot return connection 24 is approximately 0.22 in. (0.56 mm), the length C of the fluid connection 30 is approximately 0.25 in. (0.64 mm), and the length D of the main power connection 32 is approximately 0.33 in. (0.84 mm).

As a result of the configuration of each connection and their respective connection lengths, the order in which the connections are broken when the quick disconnect 10 is disengaged is controlled in accordance with the present invention. More specifically, the signal connection 18 breaks before the pilot return connection 24, the fluid connection 30, and the main power connection 32. Further, the pilot return connection 24 breaks after the signal connection 18 and before the fluid connection 30 and the main power connection 32. Then, the fluid connection 30 breaks after the signal connection 18 and the fluid connection 30 but before the main power connection 32. Finally, the main power connection 32 breaks after the signal connection 18, the pilot return connection 24, and the fluid connection 30, which results in improved operation of a plasma arc torch when the quick disconnect 10 is disengaged as described in greater detail below.

Figure 3:
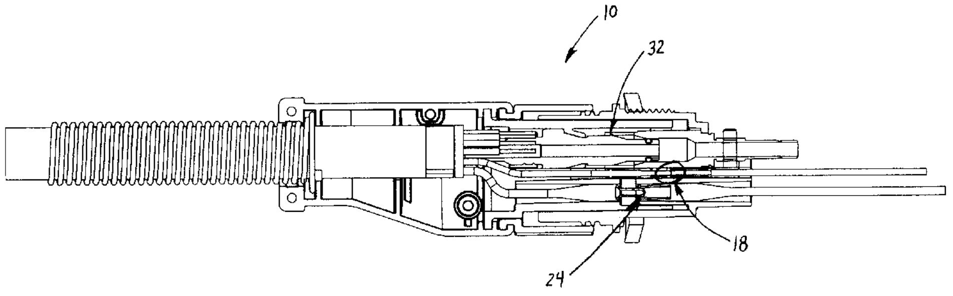
FIG. 3 is a cross-sectional view of an embodiment of a quick disconnect illustrating a signal connection disengaged before a pilot return connection, a fluid connection, and a main power connection in accordance with the principles of the present invention.

Referring now to FIG. 3, when the quick disconnect 10 is initially disengaged, the signal connection 18 breaks first as shown. Accordingly, the power supply (not shown) experiences an action similar to letting go of a torch switch (not shown) when the quick disconnect 10 is disengaged. If the quick disconnect 10 is disengaged while the plasma arc torch is in operation, the signal connection 18 would break first, causing the power supply to stop outputting power through the main power connection 32 and the pilot return connection 24. Furthermore, a plurality of signal connections 18 may be disposed within the quick disconnect 10, and in one preferred form, a total of eight (8) signal connections are employed within the quick disconnect 10. Moreover, the signal connection 18 may also be sequenced to break in a specific order, for example, breaking the trigger switch signal before the parts-in-place signal, among other possible variations specific to the different signal connections within the quick disconnect 10.

Figure 4:
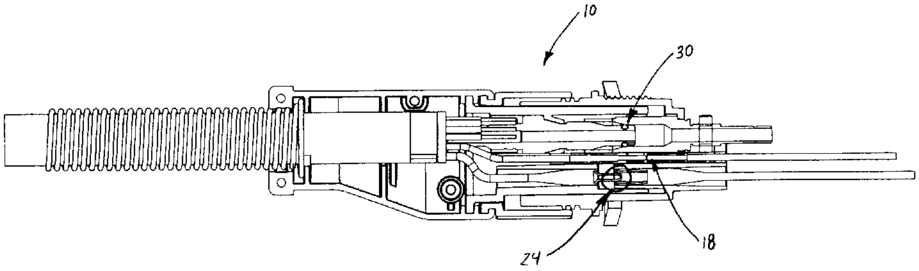
FIG. 4 is a cross-sectional view of an embodiment of a quick disconnect illustrating a pilot return connection disengaged after a signal connection and before a fluid connection and a main power connection in accordance with the principles of the present invention.

As the quick disconnect 10 is further disengaged as shown in FIG. 4, the pilot return connection 24 breaks after the signal connection 18. Accordingly, the pilot return connection 24 is broken before the fluid connection 30 such that there does not exist a possibility of trying to pilot the plasma arc torch without gas flow. Generally, the presence of gas flow provides an audible indication to the user that power is present at the torch and that the torch may pilot at any time. With the pilot return connection 24 breaking before the fluid connection 30, an additional safety feature is thereby provided to the user.

Figure 5:
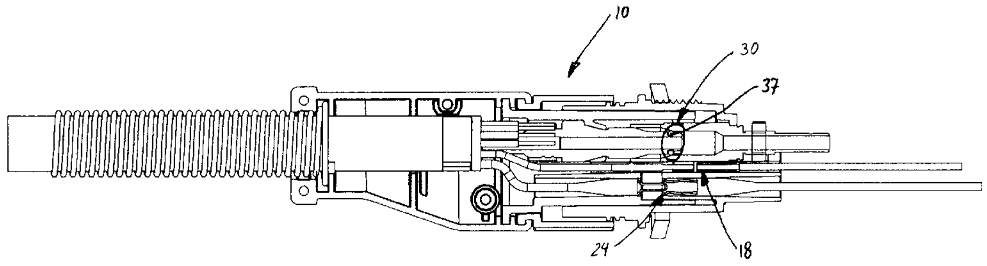
FIG. 5 is a cross-sectional view of an embodiment of a quick disconnect illustrating a fluid connection disengaged after a signal connection and a fluid connection and before a main power connection in accordance with the principles of the present invention.

Referring now to FIG. 5, as the quick disconnect 10 is further disengaged, the fluid connection 30 breaks after the signal connection 18 and the pilot return connection 24 as shown. Since the fluid connection 30 breaks after the signal connection 18 and the pilot return connection 24, gas cannot leak out of the quick disconnect 10 when the quick disconnect 10 is not fully engaged. Since the fluid connection 30 is timed to break after the signal connection 18 and the pilot return connection 24, the plasma arc torch would not function, and would further not leak gas, if the quick disconnect 10 were not fully engaged.

Figure 6:
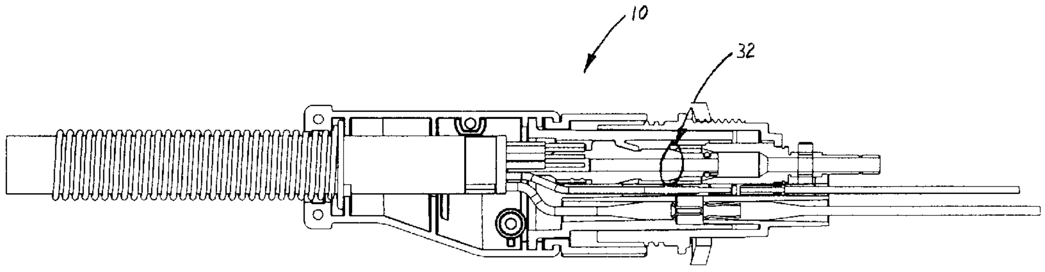
FIG. 6 is a cross-sectional view of an embodiment of a quick disconnect illustrating a main power connection disengaged after a signal connection, a pilot return connection, and a fluid connection accordance with the principles of the present invention.

As shown in FIG. 6, the main power connection 32 breaks after the signal connection 18, the pilot return connection 24, and the fluid connection 30. Further, the main power connection 32 is a relatively high current conducting member within the quick disconnect 10. Accordingly, since the main power connection 32 breaks last, the possibility of drawing an arc is minimized if the quick disconnect 10 is inadvertently disengaged during operation of the plasma arc torch.

Figure 7:
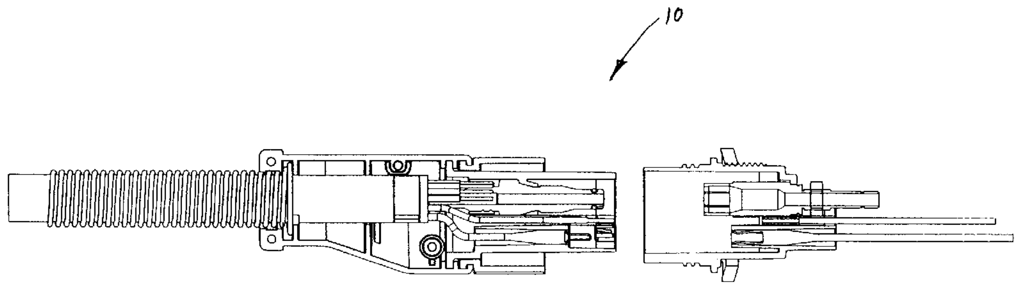
FIG. 7 is a cross-sectional view of an embodiment of a quick disconnect fully disengaged in accordance with the principles of the present invention.

Referring now to FIG. 7, the quick disconnect 10 is illustrated in the fully disengaged position, wherein all of the connections are broken. Accordingly, a quick disconnect 10 is provided wherein the connections break in a specific order when the quick disconnect is disengaged, thereby resulting in improved operation of a plasma arc apparatus.

In addition to the sequence of breaking specific connections as previously described, the signal connections 18 may also be sequenced to break in a specific order rather than breaking at the same time as described herein. For example, the signal connections 18 for a trigger switch may break first, followed by breaking the signal connections 18 for a parts-in-place switch. Accordingly, the length for the trigger switch signal connection would be shorter than the length for the parts-in-place switch signal connection. As a result, a variety of lengths A of the signal connections 18 may also be employed to sequence disconnection of various signals within the plasma arc torch.

The description of the invention is merely exemplary in nature and, thus, variations that do not depart from the substance of the invention are intended to be within the scope of the invention. Such variations are not to be regarded as a departure from the spirit and scope of the invention.

What is claimed is:

1. A quick disconnect for use in a plasma arc apparatus comprising:

at least one signal connection;

a pilot return connection;

at least one fluid connection; and at least one main power connection;

wherein the connections are configured within the quick disconnect such that when the quick disconnect is disengaged:

the signal connection breaks before the pilot return connection, the fluid connection, and the main power connection;

the pilot return connection breaks before the fluid connection and the main power connection;

the fluid connection breaks before the main power connection; and the main power connection breaks after the signal connection, the pilot return connection, and the fluid connection.

2. The quick disconnect of claim 1, wherein the signal connection defines a length that is shorter than a length of the pilot return connection, a length of the fluid connection, and a length of the main power connection.

3. The quick disconnect of claim 1, wherein the pilot return connection defines a length that is shorter than a length of the fluid connection and a length of the main power connection.

4. The quick disconnect of claim 1, wherein the fluid connection defines a length that is shorter than a length of the main power connection.

5. The quick disconnect of claim 1 further comprising a plurality of signal connections, wherein the signal connections break before the pilot return connection, the fluid connection, and the main power connection when the quick disconnect is disengaged.

6. The quick disconnect of claim 5 further comprising eight signal connections.

7. The quick disconnect of claim 5, wherein the signal connections are sequenced to break in a specific order.

8. The quick disconnect of claim 1 further comprising a plurality of main power connections, wherein the main power connections break after the signal connections, the pilot return connection, and the fluid connection when the quick disconnect is disengaged.

9. The quick disconnect of claim 1 further comprising a plurality of fluid connections, wherein the fluid connections break after the signal connections and the pilot return connection when the quick disconnect is disengaged.

10. The quick disconnect of claim 1, wherein the fluid connection and the main power connection comprise a negative lead gas carrying pin engaged within a main power socket.

11. A quick disconnect for use in a plasma arc apparatus comprising:

at least one signal connection;

at least one fluid connection; and at least one main power connection;

wherein the connections are configured within the quick disconnect such that when the quick disconnect is disengaged:

the signal connection breaks before the fluid connection;

the fluid connection breaks before the main power connection; and the main power connection breaks after the signal connection and the fluid connection.

12. The quick disconnect of claim 11, wherein the signal connection defines a length that is shorter than a length of the fluid connection and a length of the main power connection.

13. The quick disconnect of claim 11, wherein the fluid connection defines a length that is shorter than a length of the main power connection.

14. The quick disconnect of claim 11 further comprising a plurality of signal connections, wherein the signal connections break before the fluid connection and the main power connection when the quick disconnect is disengaged.

15. The quick disconnect of claim 14, wherein the signal connections are sequenced to break in a specific order.

16. The quick disconnect of claim 11 further comprising a plurality of main power connections, wherein the main power connections break after the signal connection and the fluid connection when the quick disconnect is disengaged.

17. The quick disconnect of claim 11 further comprising a plurality of fluid connections, wherein the fluid connections break after the signal connection when the quick disconnect is disengaged.

18. The quick disconnect of claim 11, wherein the fluid connection and the main power connection comprise a negative lead gas carrying pin engaged within a main power socket.

19. A quick disconnect for use in a plasma arc apparatus comprising:

at least one signal connection defining a signal connection length;

a pilot return connection defining a pilot return connection length;

at least one fluid connection defining a fluid connection length; and a main power connection defining a main power connection length;

wherein the signal connection length is shorter than the pilot return connection length, the fluid connection length, and the main power connection length; the pilot return connection length is shorter than the fluid connection length and the main power connection length; the fluid connection length is shorter than the main power connection length; and the main power connection length is longer than the signal connection length, the pilot return connection length, and the fluid connection length.

20. The quick disconnect of claim 19 further comprising a plurality of signal connections, wherein the signal connections break before the pilot return connection, the fluid connection, and the main power connection when the quick disconnect is disengaged.

21. The quick disconnect of claim 20 further comprising eight signal connections.

22. The quick disconnect of claim 20, wherein the plurality of signal connections are sequenced to break in a specific order.

23. The quick disconnect of claim 19 further comprising a plurality of main power connections, wherein the main power connections break after the signal connection, the pilot return connection, and the fluid connection when the quick disconnect is disengaged.

24. The quick disconnect of claim 19 further comprising a plurality of fluid connections, wherein the fluid connections break after the signal connection and the pilot return connection when the quick disconnect is disengaged.

25. The quick disconnect of claim 19, wherein the fluid connection and the main power connection comprise a negative lead gas carrying pin engaged within a main power socket.

26. A quick disconnect for use in a plasma arc apparatus comprising:

eight signal connections;

a pilot return connection;

a negative lead gas carrying pin disposed within a main power socket defining a main power connection and a fluid connection;

wherein the connections are configured within the quick disconnect such that when the quick disconnect is disengaged:

the eight signal connections break before the pilot return connection, the fluid connection, and the main power connection;

the pilot return connection breaks before the fluid connection and the main power connection;

the fluid connection breaks before the main power connection; and the main power connection breaks after the eight signal connections, the pilot return connection, and the fluid connection.

27. The quick disconnect of claim 26, wherein the signal connections define a length that is shorter than a length of the pilot return connection, a length of the fluid connection, and a length of the main power connection.

28. The quick disconnect of claim 26, wherein the pilot return connection defines a length that is shorter than a length of the fluid connection and a length of the main power connection.

29. The quick disconnect of claim 26, wherein the fluid connection defines a length that is shorter than a length of the main power connection.

30. The quick disconnect of claim 26, wherein the eight signal connections are sequenced to break in a specific order.

31. A quick disconnect comprising:

at least one signal connection;

at least one fluid connection; and at least one main power connection;

wherein the connections are configured within the quick disconnect such that when the quick disconnect is disengaged:

the signal connection breaks before the fluid connection and the main power connection;

the fluid connection breaks before the main power connection; and the main power connection breaks after the signal connection and the fluid connection.

32. The quick disconnect of claim 31 further comprising a plurality of signal connections, wherein the signal connections break before the fluid connection and the main power connection when the quick disconnect is disengaged.

33. The quick disconnect of claim 32, wherein the signal connections are sequenced to break in a specific order.

34. The quick disconnect of claim 31 further comprising a plurality of main power connections, wherein the main power connections break after the signal connection and the fluid connection when the quick disconnect is disengaged.

35. The quick disconnect of claim 31 further comprising a plurality of fluid connections, wherein the fluid connections break after the signal connection when the quick disconnect is disengaged.

36. The quick disconnect of claim 31, wherein the fluid connection and the main power connection comprise a negative lead gas carrying pin engaged within a main power socket.

37. A method of disengaging a quick disconnect in a plasma arc apparatus, the method comprising the steps of:

(a) disengaging the quick disconnect such that at least one signal connection breaks before a pilot return connection, a fluid connection, and a main power connection;

(b) further disengaging the quick disconnect such that the pilot return connection breaks before the fluid connection and the main power connection;

(c) further disengaging the quick disconnect such that the fluid connection breaks before the main power connection; and (d) further disengaging the quick disconnect such that the main power connection breaks after the signal connection, the pilot return connection, and the fluid connection.

* * * * *